United States Patent Office 3,553,146
Patented Jan. 5, 1971

3,553,146
LIQUID DRAIN CLEANER
Charles John Butke and Lawrence William Gates, Cincinnati, Ohio, assignors to The Drackett Company, Cincinnati, Ohio, a corporation of Delaware
No Drawing. Continuation-in-part of application Ser. No. 586,966, Oct. 17, 1966. This application Jan. 25, 1968, Ser. No. 700,356
Int. Cl. C09d 9/04; C11d 7/52; C23g 5/02
U.S. Cl. 252—170                                  5 Claims

ABSTRACT OF THE DISCLOSURE

An improved liquid drain cleaning composition comprising a chlorinated hydrocarbon solvent, a surfactant, and mineral oil.

---

This application is a continuation-in-part of our copending application Ser. No. 586,966, filed Oct. 17, 1966. The invention in that application is drawn to a composition and method for cleaning drain lines. The invention of this application relates to an improved composition and method for cleaning drains.

The use of chlorinated hydrocarbons in cleaning metal surfaces is known in the art. (See, for example, U.S. Pats. 3,060,125, 3,085,918 and 2,941,952.)

It is an object of the present invention to provide a novel, safe, and efficient liquid drain cleaning composition and method.

It is a further object of the present invention to provide an improved, safe, and efficient liquid drain cleaning composition and method.

Other objects of the present invention will become evident to those skilled in the art from the following description.

The liquid organic solvent drain cleaning compositions of Ser. No. 586,966 while exhibiting superior cleaning properties present certain problems. After prolonged contact with plastic pipes and gasketing materials, these organic solvent compositions have been found to attack materials used in the manufacture of the pipes so that dimensional distortions occur. Applicants have found quite unexpectedly that if mineral oil is added to these compositions the attack on the plastic is markedly reduced and in some instances, depending on the period of contact, entirely eliminated. The mechanism whereby this phenomenon occurs is not completely understood, since relatively minor amounts of mineral oil are effective.

According to the present invention the above-mentioned objects are accomplished by treating the contaminated drain trap and side walls of the drain pipe with a cleaning composition comprising a chlorinated organic solvent (usually a chlorinated hydrocarbon), a surfactant and mineral oil. The composition forms a chlorinated hydrocarbon-in-water emulsion upon contact with water in the drain; this emulsification gives the composition its bactericidal activity in the drain trap throughout the water phase. After about ten minutes the emulsion breaks up so that the chlorinated hydrocarbon settles into the drain trap and cleans it by displacing water and dissolving any contamination lodged there. The composition of the present invention represents an improvement in the art due to the inclusion of mineral oil. The mineral oil-containing composition greatly reduces the attack of the chlorinated hydrocarbon solvent on the various plastic materials used in the construction of drain pipes, such as acrylonitrile-butadiene-styrene, polyurethane, polyester and rubber.

Experiments have been conducted with samples of acrylonitrile-butadiene-styrene piping wherein the piping has been subjected to chlorinated hydrocarbon solvent compositions containing mineral oil and solvent compositions containing no mineral oil, with appropriate controls. In one test, piping was contacted with the above-mentioned composition for a period of nineteen (19) hours. The piping contacted with the mineral oil-containing composition showed no dimensional distortion, whereas the piping contacted with the composition containing no mineral oil showed noticeable dimensional distortions. In another experiment the piping was contacted with the above-mentioned compositions for a period of one hundred thirty-eight (138) hours. The piping contacted with the mineral oil-containing composition showed no dimensional distortions, whereas the piping contacted with the composition containing no mineral oil showed severe disfiguration, swelling and overall dimensional distortions.

The following lists of materials are given by way of example and are not meant to necessarily limit the scope of the invention:

The chlorinated organic solvents which can be employed in this process include: carbon tetrachloride, 1,2-dichloroethane, 1,1,1-trichloroethane, trichloroethylene, tetrachloroethylene, orthodichlorobenzene, 1,2-dichloropropane, 1,1,2-trichloroethane, 1,1,2,2-tetrachloroethane, pentachloroethane, and hexachloroethane.

The surfactants employed are of four general types and will produce emulsification within approximately identical weight-percent concentration ranges, for example, when 1,1,1-trichloroethane is used.

Ethoxylated alkyl phenols (i.e. Igepal CO series) will produce the desired emulsification of 1,1,1-trichloroethane within the range 1.0 to 5.0 percent by weight. The ethoxylated alkyl phenols must contain 60 to 90 percent ethylene oxide in order to be effective.

The complex aliphatic and aromatic phosphate esters (i.e. Alkapents) effectively emulsify 1,1,1-trichloroethane within a range of 0.05 to 5 percent. The phosphate esters are by far the most effective emulsifiers for most of our chlorinated solvents.

The ethoxylated fatty acids and fatty esters (i.e. Tween) emulsify 1,1,1-trichloroethane at percentages of 1 to 5 percent. Again, the ethylene oxide content must be 60 to 90 percent range with these materials, also. With this classification of surfactants, there is a variation in the effectiveness of the emulsifier dependent upon the alcohol (lauryl, stearyl-cetyl, oleyl) from which the specific surfactant was prepared.

It is apparent that the surfactant must be neither too hydrophobic nor too hydrophilic in order to emulsify the 1,1,1-trichloroethane properly upon addition to water and yet allow the solvent to settle out after approximately 10 minutes. In this respect, the 60 to 90 percent ethylene oxide content is fairly critical. The hydrophobic element of the surfactant also tends to affect the effectiveness of each type of surfactant in addition to the ethylene oxide content and percentage employed. During this work it has also been possible to generally classify the surfactants tested according to an HLB (Hydrophile-Lipophile Balance; described in a publication entitled The Atlas HLB System published by Atlas Chemical Ind., Inc., Chemicals Division, Wilmington, Del.) level. The effective HLB range seems to fall between 12 to 16 as determined by the Atlas system.

Blends of surfactants for emulsification of 1,1,1 trichloroethane, must also be considered since, in general, blends tend to work better with regard to emulsification than single surfactant systems. In this respect, the four classifications mentioned previously could possibly be interchanged within or among themselves.

Commercially available odor masking and coloring agents may be used to the compositions of this invention.

Such materials as Neutroleum, Neutroleum Beta or Gamma, synthetic citrus aroma, Nitro Fast Orange SG, and Waxoline Blue are examples of suitable additives.

According to the present invention the solvent material is used in amounts ranging from 40 to 98%; the mineral oil is used in amounts ranging from 1.0 to 59% and the surfactant is used in amounts ranging from .001 to 5.00% by weight.

The preferred embodiment for the composition of this invention is one which comprises from about 71 to 80.5 weight percent of the solvent material, from about 19 to 23 weight percent of mineral oil and from about .001 to 5.0 weight percent of the surfactant, from about 0.5 to 1.0 weight percent of citrus aroma and from about .0005 to .001 weight percent of Waxoline Blue.

1,1,1 trichloroethane is the preferred solvent due to its exceptionally good solvent properties and because it is relatively non-toxic and non-flammable.

Ethoxylated branched alkyl phosphate esters are preferred because of their superior stability in 1,1,1 trichloroethane and because of their effectiveness as emulsifiers. These esters also appear to stabilize the 1,1,1 trichloroethane and prevent its hydrolysis by water.

The compositions disclosed in our co-pending application Ser. No. 586,966 to which mineral oil has been added are examples which illustrate the present invention. Each of these compositions employs 1,1,1 trichloroethane as the chlorinated hydrocarbon solvent. These compositions are given in the attached tables:

TABLE I.—ETHOXYLATED ALKYL PHENOL SURFACTANT (IGEPAL CO SERIES, ANTARA CHEMICAL

| Surfactant | Average percent of ethylene oxide in surfactant | Approximate HLB level of surfactant (±1) | Relative percent of— | | Extent of— | |
|---|---|---|---|---|---|---|
| | | | Surfactant | Solvent | Emulsifier | Settling |
| Igepal CO 530 [1] | 50 | 10.0 | 2.5 | 97.5 | None | |
| Do. [1] | 50 | 10.0 | 5.0 | 95.0 | Do | |
| Igepal CO 630 [1] | 63 | 12.0 | 2.5 | 97.5 | Do | |
| Do. [1] | 63 | 12.0 | 5.0 | 95.0 | Slight | Too fast. |
| Igepal CO 710 [1] | 70 | 14.0 | 2.5 | 97.5 | do | Do. |
| Do. [1] | 70 | 14.0 | 5.0 | 95.0 | Fair-good | Do. |
| CO 730, 850, 880 [1] | 70-80 | 14-15 | 1-2 | 99-98 | Good | Good. |
| CO 970, 990 [1] | 90 | 16-18 | 2-5 | 98-95 | Very slight | Too fast. |

[1] Nonylphenoxypoly(ethyleneoxy)ethanol.

TABLE II.—COMPLEX AROMATIC AND ALIPHATIC PHOSPHATE ESTERS (ALKAPENTS, WAYLAND CHEMICAL CO.)

| Surfactant | Average percent of ethylene oxide in surfactant | Approximate HLB level of surfactant (±1) | Relative percent of— | | Extent of— | |
|---|---|---|---|---|---|---|
| | | | Surfactant | Solvent | Emulsifier | Settling |
| Alkapent 6TD [1] | 59 | 12.0 | 0.05 | 99.95 | Good | Too fast. |
| Do. [1] | 59 | 12.0 | 5.0 | 95.0 | do | None. |
| Do. [1] | 59 | 12.0 | 0.10-0.15 | 99.90-99.85 | do | Good. |
| Antara LE 600 | 60 | 12.0 | 0.05 | 99.95 | do | Too fast. |
| Antara LE 700 | 70 | 14.0 | 5.0 | 95.0 | do | None. |
| Do.[1] | 70 | 14.0 | 0.10-0.5 | 99.90-99.85 | do | Good. |

[1] Complex organic (aliphatic) phosphate ester in free acid form. Alkapent 6TD is synthesized from tridecyl alcohol produced by the Oxo process. Tridecyl alcohol [CH$_3$(CH$_2$)$_{11}$CH$_2$—OH] is ethoxylated with ethylene oxide to a 5½ to 6½ mole level of ethylene oxide per mole of tridecyl alcohol to form an ethoxylated tridecyl alcohol as follows:

$$CH_3(CH_2)_{11}CH_2OH + CH_2-CH_2 \longrightarrow CH_3(CH_2)_{11}CH_2(OCOH_2OCH_2)_n OH \text{ where } n=5½-6½$$

The ethoxylated alcohol is then phosphated to a mixture of mono and diesters containing a very small amount of free nonionic:

1. Monester

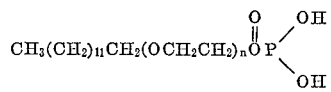

2. Diester

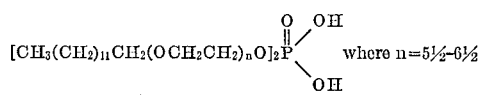

TABLE III.—ETHOXYLATED FATTY ACIDS AND FATTY ESTERS (TWEEN, ATLAS CHEMICAL CO.)

| Surfactant | Average percent of ethylene oxide in surfactant | Approximate HLB level of surfactant (±1) | Relative percent of— | | Extent of— | |
|---|---|---|---|---|---|---|
| | | | Surfactant | Solvent | Emulsifier | Settling |
| Fatty acids: | | | | | | |
| Tween 20 [1] | 84 | 16.7 | 2.5 | 97.5 | Good | Good. |
| Do. [1] | 84 | 16.7 | 5.0 | 95.0 | do | Do. |
| Tween 60 [2] | 75 | 14.9 | 2.5 | 97.5 | do | Do. |
| Do. [2] | 75 | 14.9 | 5.0 | 95.0 | do | Do. |
| Myrj 45 | 50-55 | 11 | 2.5 | 97.5 | None | |
| Fatty esters: | | | | | | |
| Atlas G-1471 | 80 | 16 | 2.5 | 97.5 | Good | Good. |
| Do | 80 | 16 | 5.0 | 95.0 | do | Do. |
| Atlas G-1790 | 60 | 12 | 2.5 | 97.5 | do | Do. |
| Do | 60 | 12 | 5.0 | 95.0 | do | Do. |
| Do | 70 | 12 | 5.0 | 95.0 | do | Do. |

[1] Polyoxyethylene sorbitan monolaurate.
[2] Polyoxyethylene sorbitan monostearate.

TABLE IV.—ETHOXYLATED FATTY ALCOHOLS (BRIJ'S, ATLAS CHEMICAL CO.)

| Surfactant | Average percent of ethylene oxide in surfactant | Approximate HLB level of surfactant (±1) | Relative percent of— | | Extent of— | |
|---|---|---|---|---|---|---|
| | | | Surfactant | Solvent | Emulsifier | Settling |
| Brij 52 [1] | 25 | 5.3 | 1.5 | 98.5 | None | |
| Brij 52 Polyoxyethylene (2) cetyl ether | 25 | 5.3 | 5.0 | 99.0 | Do. | |
| Brij 76 [2] Polyoxyethylene (10) stearyl ether | 60 | 12.4 | 5.0 | 95.0 | Good | Good. |

[1] Polyoxyethylene (2) cetyl ether.
[2] Polyoxyethelene (10) stearyl ether.

We claim:
1. A liquid drain cleaning composition consisting essentially of from 40 to 98 weight percent of a chlorinated hydrocarbon selected from the group consisting of carbon tetrachloride, 1,2 dichloroethane, 1,1,1 trichloroethane, trichloroethylene, tetrachloroethylene, orthodichlorobenzene, 1,2 dichloropropane, 1,1,2 trichloroethane, 1,1,2,2 tetrachloroethane, pentachloroethane and hexachloroethane, .001 to 5.0 weight percent of a surfactant selected from the group consisting of ethoxylated alkyl phenols wherein the alkyl group contains from 1–10 carbon atoms; aliphatic and aromatic ethoxylated phosphate esters; ethoxylated fatty acids and esters; and ethoxylated fatty alcohols wherein said surfactants have an average ethylene oxide content of from 60 to 90 weight percent and from 1 to 59 weight percent mineral oil.

2. A double-action process for cleaning plastic drains comprising treating a contaminated drain trap and pipe surface with a composition consisting essentially of from 40 to 98 weight percent of a chlorinated hydrocarbon selected from the group consisting of carbon tetrachloride, 1,2 dichloroethane, 1,1,1 trichloroethane, trichloroethylene, tetrachloroethylene, orthodichlorobenzene, 1,2 dichloropropane, 1,1,2 trichloroethane, 1,1,2,2 tetrachloroethane, pentachloroethane, and hexachloroethane, .001 to 5.0 weight percent of a surfactant selected from the group consisting of ethoxylated alkyl phenols wherein the alkyl group contains from 1–10 carbon atoms; aliphatic and aromatic ethoxylated phosphate esters; ethoxylated fatty acids and esters; and ethoxylated fatty alcohols wherein said surfactants have an average ethylene oxide content of from 60–90 weight percent and from 1 to 59 weight percent mineral oil wherein said composition forms an emulsion upon contact with water in the drain, cleans the exposed drain pipe surfaces and then breaks up so that the cleaning composition settles in the drain trap to clean it.

3. The process of claim 2 wherein the cleaning composition is allowed to remain in the drain for a period of not less than ten minutes in order for the emulsion to break and to clean the drain trap.

4. The composition of claim 1 wherein the solvent is 1,1,1 trichloroethane.

5. The composition of claim 1 wherein the surfactant is an ethoxylated alkyl phenol.

References Cited

UNITED STATES PATENTS

| | | | |
|---|---|---|---|
| 1,819,585 | 8/1931 | Zuckermandel | 252—170 |
| 2,356,254 | 8/1944 | Lehmann, Jr. et al. | 252—8.55B |
| 3,167,514 | 1/1965 | Baker | 252—170 |
| 3,360,472 | 1/1967 | Renold | 252—170 |

OTHER REFERENCES

Rose: The Cond. Chem. Dict., vol. 6, Reinhold Publ. Co., 1961, p. 831.

LEON D. ROSDOL, Primary Examiner

W. E. SCHULZ, Assistant Examiner

U.S. Cl. X.R.

106—311; 134—22, 40; 252—364; 260—652.5